US011832753B2

(12) United States Patent
Henkel

(10) Patent No.: US 11,832,753 B2
(45) Date of Patent: Dec. 5, 2023

(54) POUR OVER FRAME, AND RELATED COMPONENTS AND METHODS

(71) Applicant: MiiR Holdings, LLC, Seattle, WA (US)

(72) Inventor: Geoff Henkel, Seattle, WA (US)

(73) Assignee: MIIR HOLDINGS, LLC, Seattle, WA (US)

( * ) Notice: Subject to any disclaimer, the term of this patent is extended or adjusted under 35 U.S.C. 154(b) by 659 days.

(21) Appl. No.: 16/533,546

(22) Filed: Aug. 6, 2019

(65) Prior Publication Data

US 2020/0315390 A1 Oct. 8, 2020

Related U.S. Application Data

(60) Provisional application No. 62/723,349, filed on Aug. 27, 2018.

(51) Int. Cl.
*A47J 31/06* (2006.01)

(52) U.S. Cl.
CPC ..................... *A47J 31/06* (2013.01)

(58) Field of Classification Search
CPC ....................................... A47J 31/06
USPC ........................................... 99/322
See application file for complete search history.

(56) References Cited

U.S. PATENT DOCUMENTS

| 3,344,734 A | 10/1967 | Aguirre-Batres et al. |
| 3,800,954 A | 4/1974 | Lampcov |
| 4,362,623 A | 12/1982 | Holopainen |
| D274,115 S | 6/1984 | Gavin |
| 4,715,271 A | 12/1987 | Kitagawa |
| 4,863,601 A | 9/1989 | Wittekind et al. |

(Continued)

FOREIGN PATENT DOCUMENTS

| JP | 2012210396 A | * 11/2012 |
| JP | HA2800370600 | 4/2016 |

(Continued)

*Primary Examiner* — Dana Ross
*Assistant Examiner* — Joseph W Iskra
(74) *Attorney, Agent, or Firm* — Janeway Patent Law PLLC; John M. Janeway

(57) ABSTRACT

A device, couplable with another, corresponding device to form a pour-over frame, includes a panel having a body between a first end of the panel, a second end of the panel opposite the first end, a top of the panel, and a bottom of the panel opposite the top. The first end of the panel includes a slot having a width. The second end of the panel includes a tongue that has a region and a lock. The tongue's region has a thickness that is less than the slot's width and is configured to extend into the slot of another, corresponding device. The tongue's lock is operable to hold the tongue's region in the slot of the other, corresponding device. The panel's bottom includes an interface operable to contact a container to support the panel above the container. When the device is coupled with another, corresponding device to form a pour-over frame, the region of the device's tongue extends into the slot of the other, corresponding device, and the slot of the device receives a region of another, corresponding device's tongue. When formed, the pour-over frame is operable to hold a coffee filter with coffee grounds disposed in the filter while one pours water on the coffee grounds to produce drip coffee.

17 Claims, 6 Drawing Sheets

(56) References Cited

U.S. PATENT DOCUMENTS

| | | | |
|---|---|---|---|
| 5,132,124 A | | 7/1992 | Tamaki |
| 5,318,786 A | | 6/1994 | Clarkson |
| 5,605,710 A | | 2/1997 | Pridonoff |
| 5,771,777 A | * | 6/1998 | Davis .................. A47J 31/02 99/279 |
| 5,842,408 A | | 12/1998 | Hatta |
| 7,918,364 B2 | | 4/2011 | Kim |
| D653,079 S | | 1/2012 | King |
| D679,942 S | | 4/2013 | Lyall, III |
| 8,746,131 B2 | | 6/2014 | Saitoh |
| D717,109 S | | 11/2014 | Simontov |
| D761,054 S | | 7/2016 | Simontov |
| D768,435 S | | 10/2016 | Hoorntje |
| D877,609 S | | 3/2020 | Elman |
| D878,932 S | | 3/2020 | Holley, Jr. |
| D885,177 S | | 5/2020 | Sevsek |
| 2003/0059500 A1 | | 3/2003 | Bailey et al. |
| 2006/0177159 A1 | | 8/2006 | Aikenhead |
| 2012/0000369 A1 | | 1/2012 | Saitoh et al. |
| 2017/0071394 A1 | * | 3/2017 | Numata ................ A47J 31/08 |
| 2018/0257853 A1 | | 9/2018 | Chuang |
| 2019/0029460 A1 | | 1/2019 | Cohen |
| 2019/0313837 A1 | | 10/2019 | Wu |

FOREIGN PATENT DOCUMENTS

| | | |
|---|---|---|
| JP | HJ3002781500 | 8/2018 |
| JP | HJ3005567100 | 12/2018 |
| JP | 1644672 | 10/2019 |

* cited by examiner

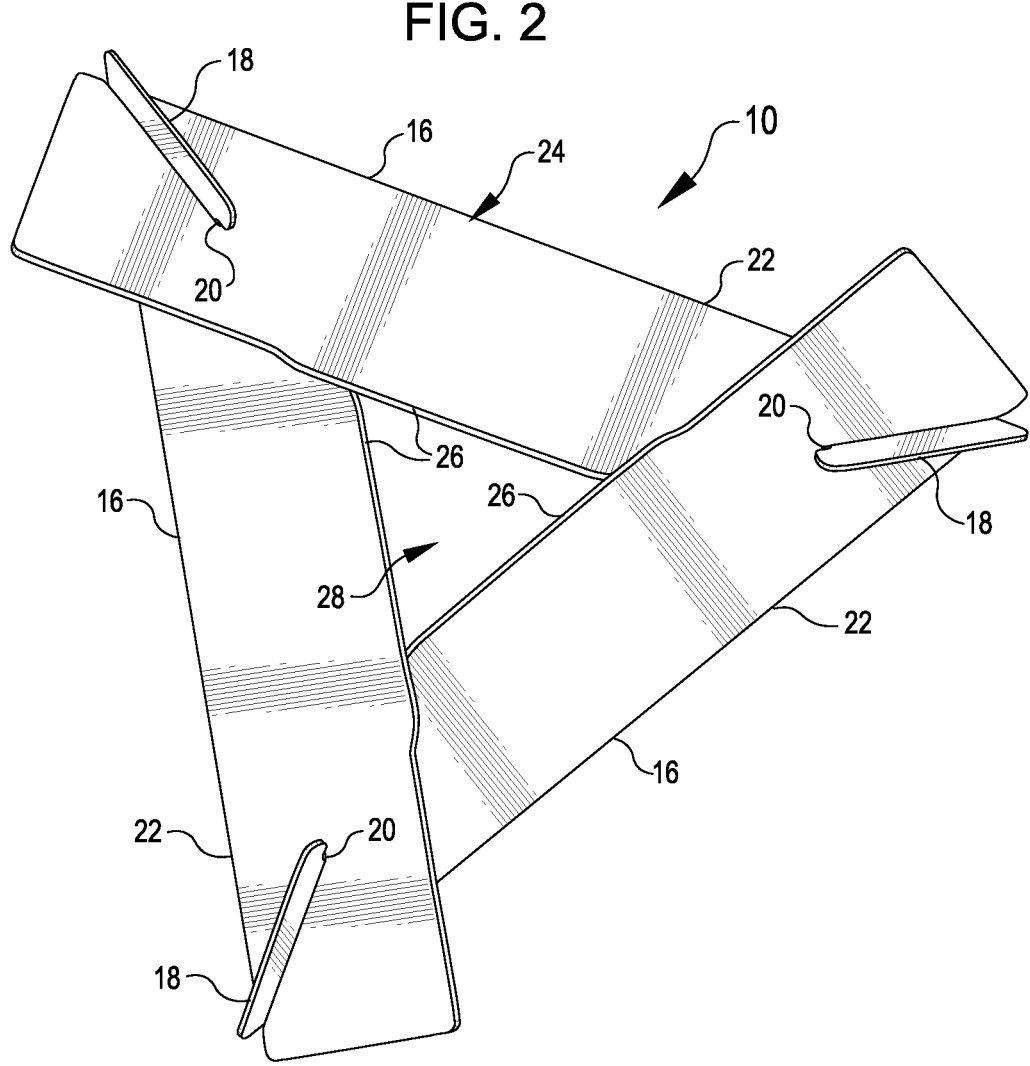

POUR OVER FRAME, AND RELATED COMPONENTS AND METHODS

BACKGROUND

There are many different ways to make or brew coffee to drink. For example, one can use a French press that submerges coffee grounds in a container of hot water for a period and then isolates the grounds at the bottom of the container while one pours the coffee in a cup to drink. Or, one can force hot water under high pressure through coffee grounds in an espresso machine to pull a shot of coffee to drink. Or, one can simply pour hot water over coffee grounds held in a filter to drip coffee into a container or cup.

Of these three common techniques for making coffee, the easiest and quickest technique is simply pouring hot water over coffee grounds held in a filter. Using a French press requires a container and filter specifically designed for each other so that one can isolate the coffee grounds inside the container before pouring the coffee in a cup. Using an espresso machine requires substantial power to heat and then force under substantial pressure the water through the grounds. because of this, the espresso machine is a specially designed machined that is bulky and not easily transportable. But, using a filter and simply pouring hot water over coffee grounds to obtain drip coffee only requires a filter and a holder or funnel to hold the filter and coffee grounds while one pours water over the grounds.

Unfortunately, however, the holder or funnel can be difficult to carry in a backpack for camping or a day pack while traveling because the holder or funnel is bulky and awkward to store in such packs. The cone shape of the holder or funnel takes up much space in a typical backpack or day pack.

Thus, there is a need for a device that can be easily assembled into a holder or funnel that can hold coffee grounds while one pours hot water over the grounds to make drip coffee, and then when finished making the coffee to drink, can be easily disassembled for easy and compact storage.

SUMMARY

In one aspect of the invention, a device is couplable with another, corresponding device to form a pour-over frame. The device includes a panel having a body between a first end of the panel, a second end of the panel opposite the first end, a top of the panel, and a bottom of the panel opposite the top. The first end of the panel includes a slot having a width. The second end of the panel includes a tongue that has a region and a lock. The tongue's region has a thickness that is less than the slot's width and is configured to extend into the slot of another, corresponding device. The tongue's lock is operable to hold the tongue's region in the slot of the other, corresponding device. The panel's bottom includes an interface operable to contact a container to support the panel above the container. When the device is coupled with another, corresponding device to form a pour-over frame, the region of the device's tongue extends into the slot of the another, corresponding device, and the slot of the device receives a region of another, corresponding device's tongue. When formed, the pour-over frame is operable to hold a coffee filter with coffee grounds disposed in the filter while one pours water on the coffee grounds to produce drip coffee. In some embodiments, three corresponding devices may be coupled together to form a pour-over frame. But in other embodiments, two, or more than three, corresponding devices may be coupled together to form a pour-frame.

With the device's ability to be coupled with one or more other, corresponding devices, one can easily form a pour-over frame when one wants to make some coffee to drink, and then disassemble the pour-over frame when finished. This allows one to easily pack and/or store the devices for travel, which is especially true when each device is a flat or substantially flat panel. When one wants to make some coffee to drink, one can couple the devices together to form the pour-over frame, heat some water, and then pour the heated water over the coffee grounds held in the pour-over frame. When one is finished, one can uncouple the devices from each other and store them together or separately in one's pack.

In another aspect of the invention, a method for brewing coffee includes forming a pour-over frame that includes a cavity, placing a coffee filter in the cavity of the pour-over frame, and positioning the pour-over frame and coffee filter above a container. Forming the pour-over frame includes coupling a device with another, corresponding device by: 1) inserting a region of the device's tongue that is located at a second end of the device's panel into a slot of a first end of another, corresponding device, and 2) receiving in a slot of a first end of the device's panel a region of a tongue located at a second end of a panel of another, corresponding device.

BRIEF DESCRIPTION OF THE DRAWINGS

Each of FIGS. 1A and 1B shows a perspective view of a pour-over frame, each according to an embodiment of the invention.

FIG. 2 shows a bottom view of the pour-over frame shown FIGS. 1A and 1B, according to an embodiment of the invention.

Each of FIGS. 3A and 3B shows a portion of two devices of the pour-over frame shown in FIGS. 1A-2, coupled with each other to form a section of the pour-over frame, each according to an embodiment of the invention.

DETAILED DESCRIPTION

Figure 1A:
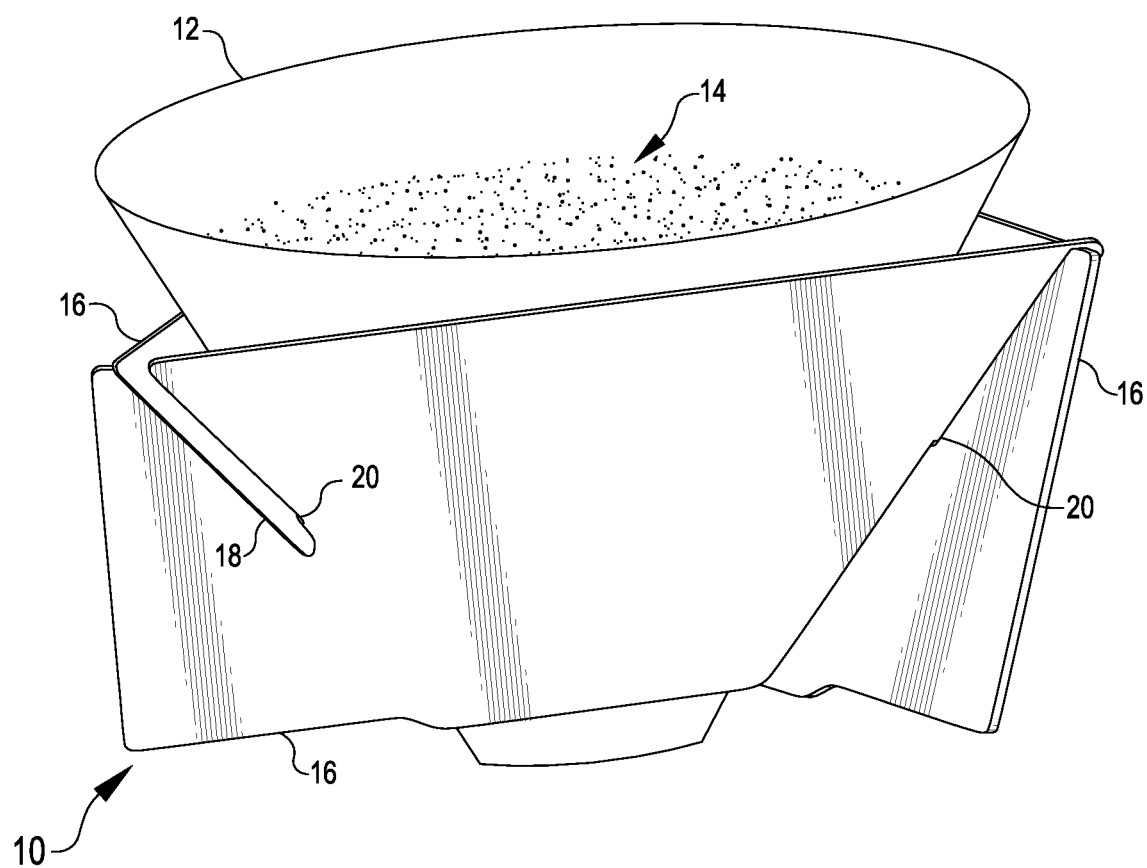
FIG. 1A shows the pour-over frame holding a filter containing coffee grounds.
Figure 1B:
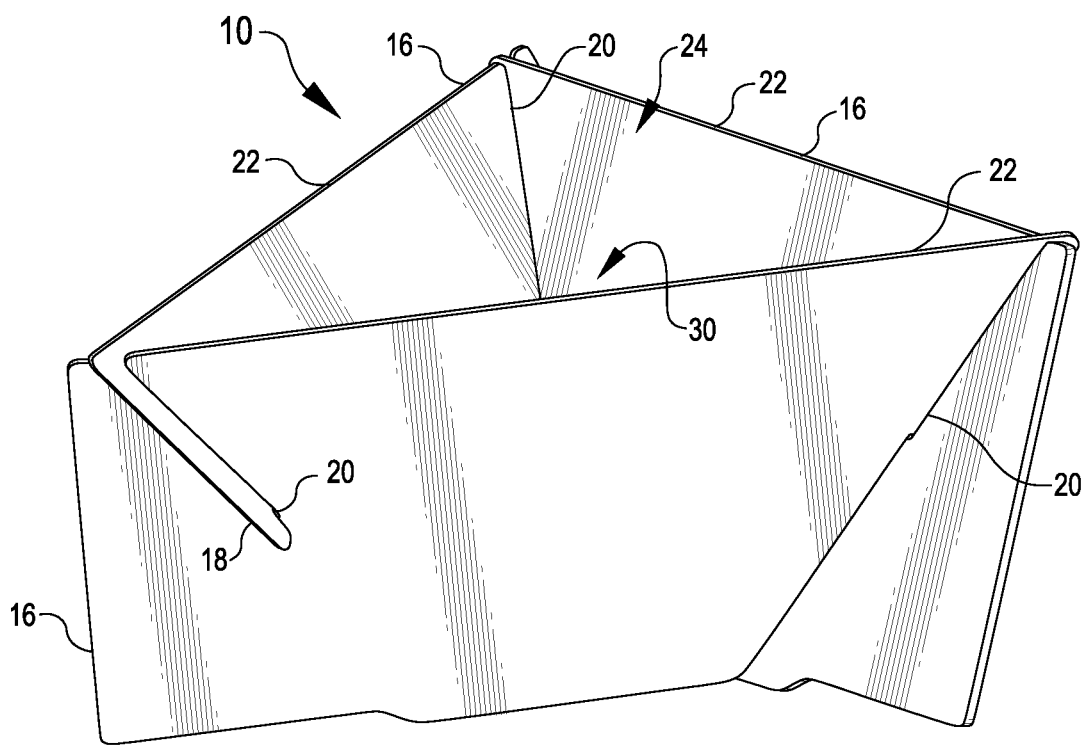
FIG. 1B shows the pour-over frame without the filter and coffee grounds.

Each of FIGS. 1A and 1B shows a perspective view of a pour-over frame 10, each according to an embodiment of the invention. FIG. 1A shows the pour-over frame 10 holding a filter 12 containing coffee grounds 14, and FIG. 1B shows the pour-over frame 10 without the filter 12 and coffee grounds 14. Although the pour-over frame 10 is shown holding coffee grounds 14, the pour-over frame 10 may be used to hold tea or other products that one pours water or any other liquid over to form a drink, broth or syrup. Additionally, the pour-over frame 10 may be used as a funnel without the filter 12, to help direct a liquid, powder and/or granules into a container.

Figure 3A:
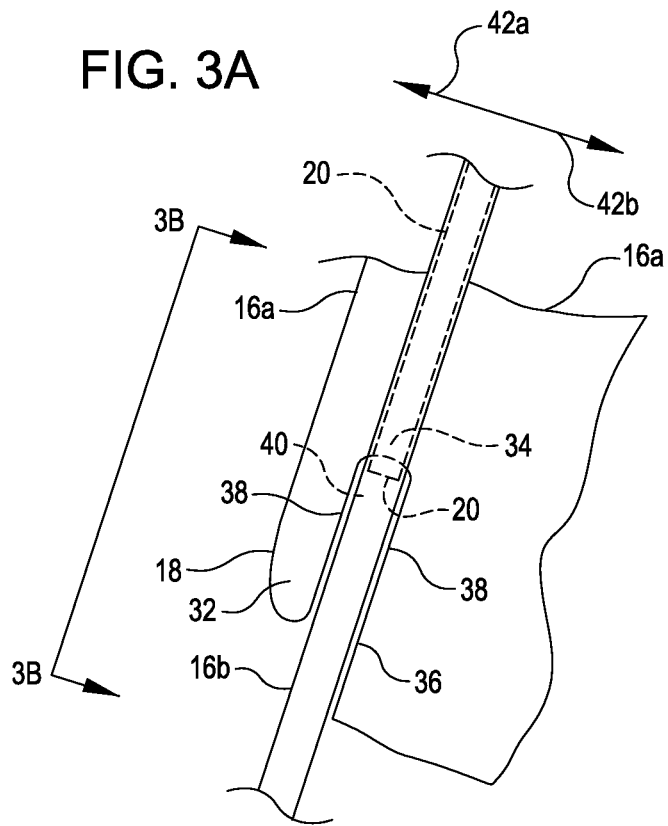
FIG. 3A shows one view of the coupling and FIG. 3B shows another view of the coupling from an angle that is 90 degrees relative to the view shown in FIG. 3A, each according to an embodiment of the invention.
Figure 3B:
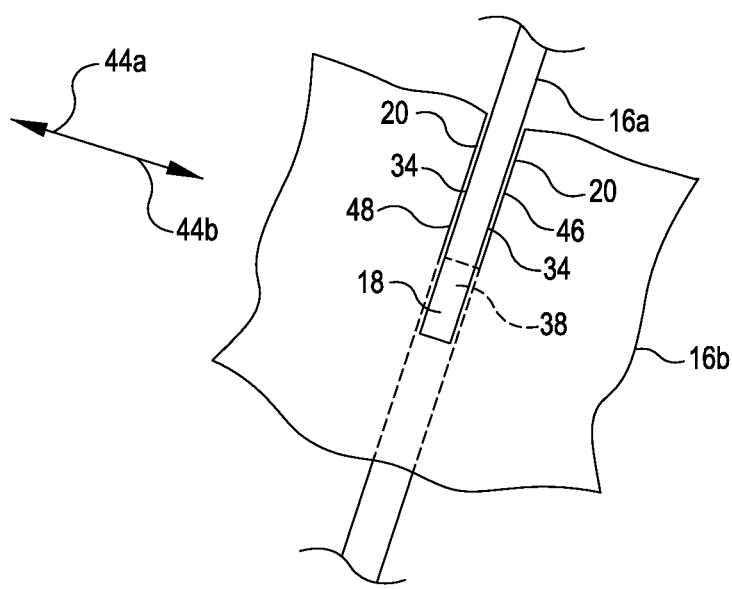

The pour-over frame 10 is formed by coupling devices 16 (discussed in greater detail in conjunction with FIGS. 4 and 5), each of which correspond with the others, together as shown in and discussed in greater detail in conjunction with FIGS. 3A and 3B. In this and other embodiments, the pour-over frame 10 is formed by coupling three, identical devices 16 together. In still other embodiments, the pour-over frame 10 is formed by coupling devices 16 that correspond with, but are not identical to, each other. To couple the devices 16 together, one inserts a tongue 18 of a device 16 through a slot 20 of an adjacent device 16. When three devices 16 are used to form the pour-over frame 10, the tongue 18 of a first device is inserted through the slot 20 of a second device 16, the tongue 18 of the second device 16 is inserted through the slot 20 of a third device 16, and the tongue 18 of the third device 16 is inserted through the slot 20 of the first device 16. In this manner, the devices 16 can be easily coupled with each other to form the pour-over frame 10, and easily uncoupled to disassemble the pour-over frame 10.

With the ability of the device 16 to be coupled with one or more other, corresponding devices 16, one can easily form a pour-over frame 10 when one wants to make some coffee to drink, and then disassemble the pour-over frame 10 when finished. This allows one to easily pack and/or store the devices 16 for travel, which is especially true when each device 16 is a flat or substantially flat panel. When one wants to make some coffee to drink, one can couple the devices 16 together to form the pour-over frame 10, heat some water, and then pour the heated water over the coffee grounds 14 held in the pour-over frame 10. When one is finished, one can uncouple the devices 16 from each other and store them together or separately in one's pack.

FIG. 2 shows a bottom view of the pour-over frame 10 shown in FIGS. 1A and 1B, according to an embodiment of the invention.

The pour-over frame 10, once formed, may have any desired configuration. For example, in this and other embodiments, the pour-over frame 10, once formed, is shaped like a truncated tetrahedron—a right frustum of a pyramid with a triangular base, or a triangular-based pyramid with its top sliced off such that the cut is parallel to the base. More specifically, once formed, the pour-over frame 10 includes a top 22 (also and more clearly shown in FIG. 1B) having an opening 24 (also shown more clearly in FIG. 1B), a bottom 26 having an opening 28, and a cavity 30 (also shown more clearly in FIG. 1B) in which the filter 12 (FIG. 1A) is held when the pour-over frame 10 holds the filter. In this configuration, the slope of each device 16 relative to a plane that the opening 24 of the top 22 of the pour-over 10 lies in is approximately sixty degrees. Thus, each of the devices 16 extends toward the bottom 26 at a rate that is about 1.7 times greater than the rate at which each of the devices 16 extends toward each other. And for the specific size of the device 16 (discussed in greater detail in conjunction with FIGS. 4 and 5), the area of the opening 28 of the pour-over's bottom 26 is about one tenth the area of the opening 24 of the pour-over's top 22.

In this configuration, the volume of the cavity 30 is relatively small compared to the area of the pour-over bottom's opening 28 and the pour-over top's opening 24. This tends to limit the amount of time that the hot water contacts the coffee grounds as the water flows through the pour-over's cavity 30, and thus limits the strength of the coffee brew. To strengthen the coffee brew, other configurations of the pour-over 10 may include devices 16 that extend toward the bottom 26 at a rate that is less than 1.7 times the rate at which they extend toward each other. Additionally or alternatively, the area of the opening 28 of the pour-over frame's bottom 26 may be less than one tenth the area of the opening 24 of the pour-over frame's top 22.

Other embodiments are possible. For example, the pour-over frame 10, once formed, may be shaped like a truncated square pyramid, or a truncated cone with a circular or elliptical base. For another example, the pour-over frame 10, may have a bottom that forms a floor through which one or more holes are located to allow the brewed coffee to exit the pour-over frame 10. This may be desirable to substantially increase the amount of time that the hot water contacts the coffee grounds and thus increase the strength of the brewed coffee.

Each of FIGS. 3A and 3B shows a portion of two devices 16a and 16b of the pour-over frame 10 shown in FIGS. 1A-2, coupled with each other to form a section of the pour-over frame 10, each according to an embodiment of the invention. FIG. 3A shows one view of the coupling and FIG. 3B shows another view of the coupling from an angle that is 90 degrees relative to the view shown in FIG. 3A, each according to an embodiment of the invention.

The devices 16 may be coupled together in any desired manner that allows the devices 16 to be easily coupled and uncoupled, and that, while coupled, allows the devices 16 to support and hold a filter and product held by the filter while water flows through both. For example, in this and other embodiments, the devices 16a and 16b are coupled by inserting a tongue 18 of a device 16a through a slot 20 of another device 16b. More specifically, the tongue 18 includes a lock 32, and a region 34 from which the tongue's lock 32 extends along an end 36 of the device 16a to form a slot 38 in the device 16a. When the devices 16a and 16b are coupled, the tongue's lock 32 of the device 16a extends through the slot 20 of the device 16b such that the tongue's region 34 is positioned inside the slot 20, while the end 40 of the slot 20 of the device 16b is positioned between the tongue's lock 32 and the end 36 of the device 16a. To facilitate the insertion of the tongue's lock 32 through the slot 20 of the device 16b, the thickness of the whole lock 32 of the tongue 18 is less than the width of the slot 20 of the device 16b all along the slot's length, and the width of the slot 38 in the device 16a is greater than the thickness of the end 40 of the slot 20 of the device 16b.

In this configuration, the device 16a is prevented from moving relative to the device 16b in the direction 42a (FIG. 3A) when the end 36 of the device 16a contacts the slot's end 40 of the device 16b; and is prevented from moving in the direction 42b (FIG. 3A) when the tongue's lock 32 of the device 16a contacts the slot's end 40 of the device 16b. Similarly, the device 16b is prevented from moving relative to the device 16a in the direction 44a (FIG. 3B) when the lock's region 34 contacts the surface 46 of the slot 20 of the device 16b; and is prevented from moving relative to the device 16a in the direction 44b (FIG. 3B) when the lock's region 34 contacts the surface 48 of the slot 20 of the device 16b. In this configuration, the directions 44a and 44b are orthogonal to the directions 42a and 42b, and all four directions lie in the same plane. The container (not shown) that the device 16b lies on and the weight of the device 16a on the device 16b prevent movement of the devices 16a and 16b relative to each other in a direction that is orthogonal to the plane of the four directions 42a, 42b, 44a, and 44b.

Other embodiments are possible. For example, the lock 32 of the tongue 18 may be configured to maintain contact with the slot's end 40 of the device 16b when the devices 16a and 16b are coupled together. In this manner, the lock 32 and end 36 of the device 16a pinch the end 40 of the slot 20 of the device 16b. This may be desirable to more securely hold the two devices 16a and 16b together when they are coupled. However, such pinching can also make uncoupling the devices 16a and 16b more difficult, and thus make disassembling a pour-over frame 10 that includes such devices 16a and 16b more difficult.

Figure 4:
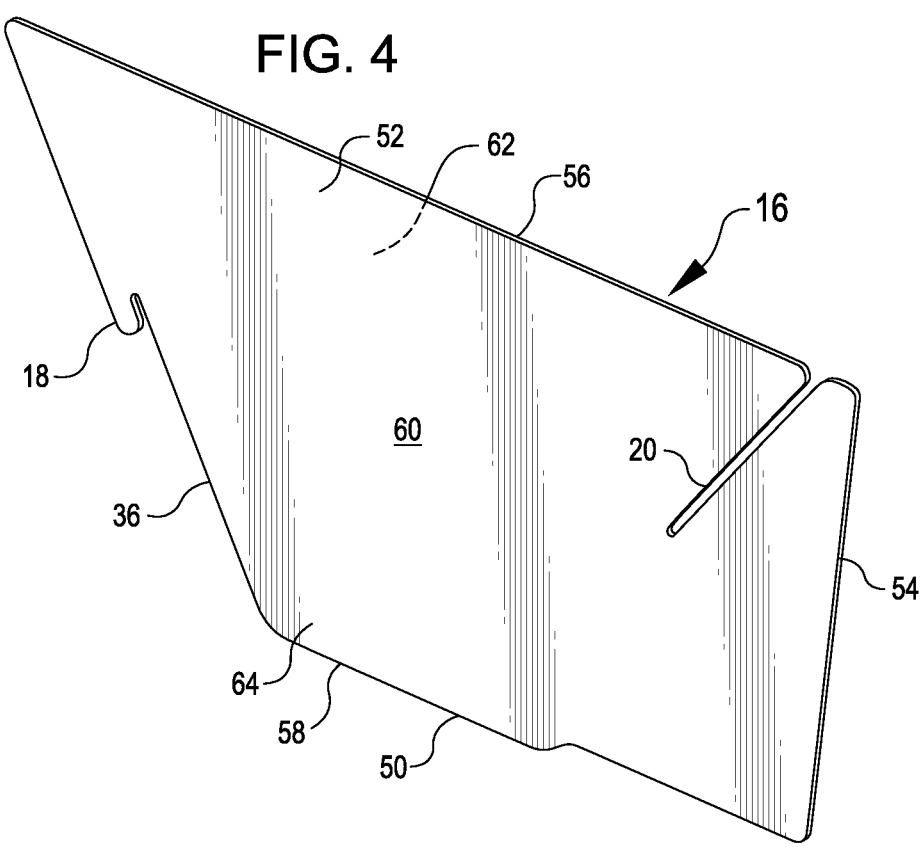
FIG. 4 shows a perspective view of the device shown in FIGS. 1A-3B, according to an embodiment of the invention.
Figure 5:
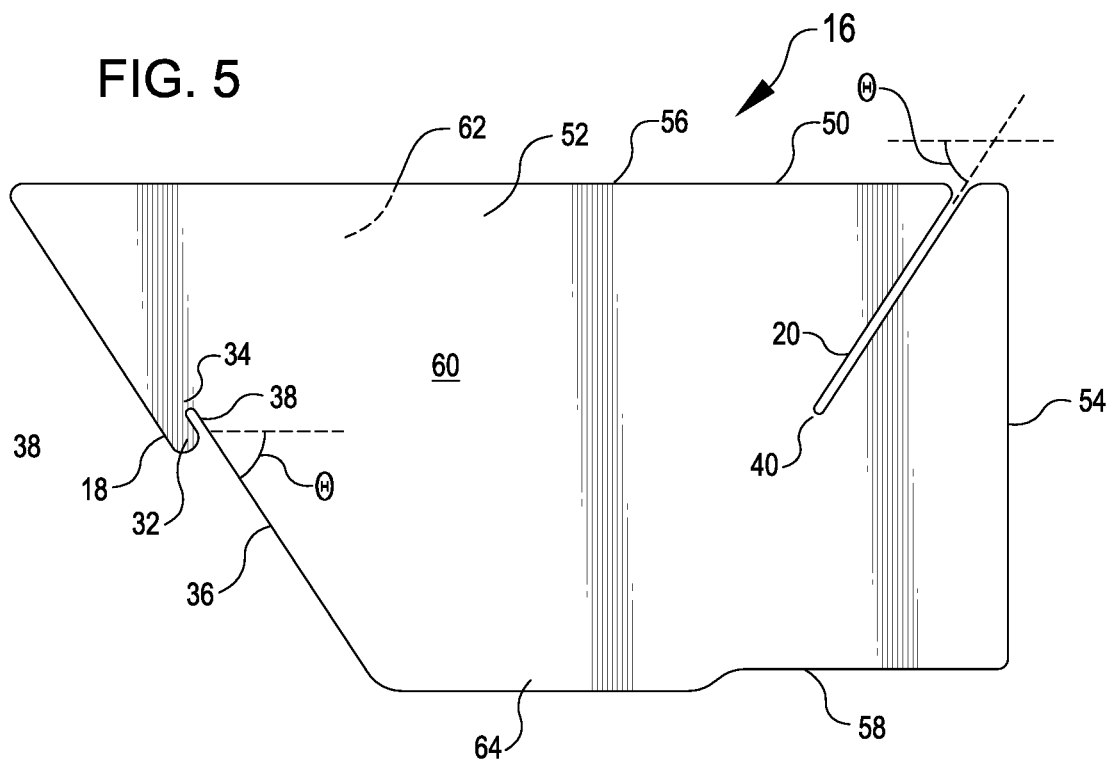
FIG. 5 shows a side view of the device shown in FIG. 4, according to an embodiment of the invention.

FIG. 4 shows a perspective view of the device 16 shown in FIGS. 1A-3B, according to an embodiment of the invention. FIG. 5 shows a side view of the device 16 shown in FIG. 4, according to an embodiment of the invention. As previously mentioned, in this and other embodiments, three of the devices 16 shown in FIGS. 4 and 5, each identical in configuration, are coupled together to form the pour-over frame 10 shown in FIGS. 1A-2. However, in other embodiments, three devices 16 whose configurations correspond with each other, but are not identical with each other, may also be coupled together to form a pour-over frame 10.

In this and other embodiments, the device 16 includes a panel 50 that has a body 52, a first end 54, a second end 36 (also shown in FIGS. 3A and 3B), a top 56 and a bottom 58. The first end 54 is opposite the second end 36, and includes the slot 20;

and the second end 36 includes the tongue 18. The panel 50 may be configured as desired and may include any desired material. For example, in this and other embodiments the panel 50 is rectangular with the first end being orthogonal or 90 degrees relative to the top 56 and bottom 58, and the second end 36 being at an angle other than 90 degrees—similar to a side of a parallelogram or a trapezoid. In other embodiments, the panel 50 may be configured as another four-sided polygon, or a polygon having fewer than or more than four sides. In addition, the panel 50 may be curved in a direction other than in the two-dimensional plane that each of the ends 36 and 54, the top 56, and the bottom 58 together define—that is, the panel 50 may not be flat as shown in FIGS. 4 and 5. The panel 50 is also made of steel to provide the panel 50 durability to withstand coupling and uncoupling many times, and the physical wear and tear that the panel 50 will experience in use making coffee and being packed and carried wherever, whenever. In other embodiments, the panel 50 may be include any other desired material capable of withstanding the wear and tear that the panel will experience and the heat from hot water that the panel 50 will be exposed to, such as any other metal, any desired plastic, and/or any desired rubber.

The body 52 of the panel 50 may be configured as desired. For example, in this and other embodiments the body 52 includes a first side 60 and a second side 62 that are parallel to each other, and each of which includes a smooth surface. The body 52 also has a thickness that is approximately one tenth of an inch. In other embodiments, the body 52 may have a thickness that varies across the extent of the body between the top 56 and the bottom 58, and or between the first end 54 and the second end 36. Additionally or alternatively, the first side 60 may include grooves to help suspend regions of a coffee filter off of the surface 60 to promote the flow of water through regions of the filter that are located above the opening 28 (FIG. 2) of the pour-over frame 10 (FIGS. 1A-2) that the device's bottom 58 defines with the other two devices 16. Such grooves may extend in a general direction that corresponds with the direction from the panel's top 56 toward the panel's bottom 58. Additionally or alternatively, such grooves may extend in a general direction that corresponds with the direction from the panel's first end 54 toward the panel's second end 36.

Still referring to FIGS. 4 and 5, each of the panel's top 56 and bottom 58 may be configured as desired. For example, in this and other embodiments the panel's top 56 extends between the panel's first end 54 and second end 36 along a straight line, and for a distance that is greater than the distance that the panel's bottom 58 extends between the first end 54 and the second end 36. In other embodiments the panel's top may be contoured or extend between the panel's first end 54 and second end 36 along a curve. The panel's bottom 58 includes an interface 64 to contact a container, when the device 16 is positioned over the container. More specifically, the interface 64 includes a region 64 that is configured to be inserted into a container, when the device 16 forms a pour-over frame with other devices 16. This helps hold or secure the pour-over frame in the proper position over the container while one uses the pour-over frame.

Each of the panel's first end 54 and second end 36 may be configured as desired. Because the device 16 in this embodiment is designed to be coupled with two other identically-configured devices 16 as show in FIGS. 3A and 3B, the portion of the second end 36 that extends from the tongue 18 to the bottom 58 extends at the same angle θ as the slot 20 in the first end 54 extends toward the bottom 58—about 60 degrees. In this and other embodiments the slot 20 in the first end 54 has an entrance at the top 56 of the panel 50 and extends toward the panel's second end 36 and bottom 58 along a straight line. In other embodiments, the slot 20 may have an entrance at the first end 54, or may not have an entrance at neither the top 56 nor the first end 54. Additionally or alternatively, the slot 20 may extend toward the second end 36 and bottom 58 at an angle θ other than 60 degrees. Additionally or alternatively, the slot 20 may extend along a line that is not straight but curved. Likewise, the second end 36 includes a tongue 18 that is configured to match the configuration of the slot 20, and the whole portion of the second end 36 that extends from the tongue 18 to the bottom 58 is configured to contact either of the sides 60 or 62 of the device 16 that the tongue 18 is coupled with. In other embodiments, only a region of this portion may contact either side 60 or 62, when the tongue 18 is coupled with another device 16. Additionally or alternatively, the second end 36 may be configured such that a portion, as opposed to the whole, of the tongue 18 extends through the slot 20 when the tongue 18 is coupled with another device 16.

Figure 6:
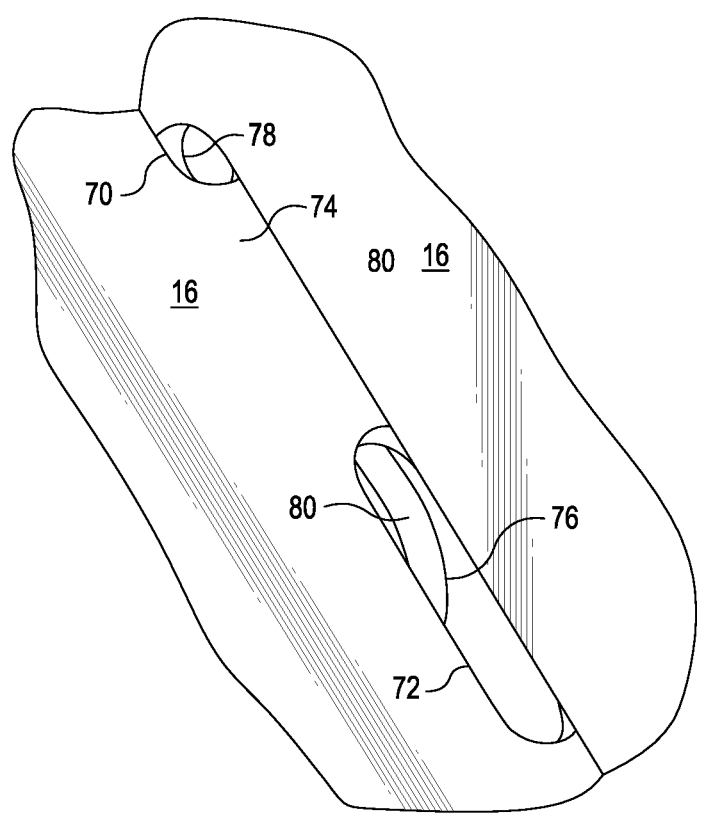
FIG. 6 shows a portion of two devices of a pour-over frame coupled with each other to form a section of a pour-over frame, according to another embodiment of the invention.

FIG. 6 shows a portion of two devices 16 of a pour-over frame 10 coupled with each other to form a section of a pour-over frame, according to another embodiment of the invention. This embodiment is similar to the embodiments discussed in conjunction with FIGS. 1A-5, except that the slot 70 includes a hole 72 located adjacent the end 74 of the slot 70, and the lock portion 76 of the tongue 78 includes a tip 80 that is sized and configured to extend into the hole 72 when the devices 16 are coupled together. In this manner, the two device 16 may be more securely coupled with each other.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A device coupleable with another, corresponding device to form a pour-over frame, the device comprising:
a panel having a body between a first end of the panel, a second end of the panel opposite the first end, a top of the panel, and a bottom of the panel opposite the top, wherein:
the first end includes a slot having a width,
the second end includes a tongue having a region and a lock, the region having a thickness that is less than the slot's width but greater than one half of the slot's width, and configured to extend into the slot of another, corresponding device when the device is coupled with the other corresponding device, the lock being operable to hold the tongue's region in the slot of the other, corresponding device when the device is coupled with the other corresponding device,
the bottom includes an interface operable to contact a container to support the panel above a container when the device is coupled with another, corresponding device; and
wherein, when the device is coupled with another, corresponding device to form a pour-over frame that holds a coffee filter with coffee grounds disposed in the filter while one pours water on the coffee grounds:
the region of the device's tongue extends into the slot of another, corresponding device and is allowed to move within the slot toward the top of the panel of the other, corresponding device when the tongue is urged in the direction of the top of the panel of the other, corresponding device, and
the slot of the device receives a region of another, corresponding device's tongue.

2. The device of claim 1 wherein the body has a first side and a second side, each bounded by the first end, the second end, the top and the bottom, and each side parallel to the other side.

3. The device of claim 1 wherein the tongue's lock has a thickness that is less than the slot's width.

4. The device of claim 1 wherein:
the second end includes a second slot formed between the second end and the tongue, wherein the tongue extends along the second end toward the bottom of the device's panel, and
the region of the tongue that extends into the slot of another, corresponding device when the device is coupled with the other corresponding device, is located at the end of the second slot.

5. The device of claim 1 wherein when the tongue's region extends into the slot of another, corresponding device, the tongue's lock is positioned adjacent a side of the other, corresponding device and contacts the side when the tongue is moved relative to the other, corresponding device's side, to prevent the separation of the two devices.

6. The device of claim 1 wherein when the tongue's region extends into the slot of another, corresponding device, the tongue's lock contacts a side of the other, corresponding device to prevent the separation of the two devices.

7. The device of claim 1 wherein the slot of the panel's first end has an entrance located at the top of the panel.

8. The device of claim 1 wherein the slot of the panel's first end extends toward the panel's second end and bottom.

9. The device of claim 1 wherein the slot of the panel's first end has an entrance located at the top of the panel, and extends in a straight line toward the panel's second end and bottom.

10. The device of claim 1 wherein the slot of the panel's first end has an entrance located at the top of the panel, and extends in a straight line at a 60-degree angle relative to the panel's top, toward the panel's second end and bottom.

11. The device of claim 1 wherein the width of the slot of the panel's first end is consistent over the length of slot.

12. The device of claim 1 wherein the panel's second end extends from the panel's tongue to the panel's bottom at a 60-degree angle relative to the panel's bottom.

13. The device of claim 1 wherein the panel's top has a length, and the panel's bottom has a length that is shorter than the length of the panel's top.

14. The device of claim 1 wherein the panel's top extends between the first end and the second end in a straight line.

15. The device of claim 1 wherein the interface of the panel's bottom includes a region configured to be inserted into a container, when the device is coupled with another, corresponding device to form a pour-over frame and the pour-over frame is positioned on top of the container.

16. A pour-over frame for brewing coffee, the pour-over frame comprising:
three or more devices, each coupled with two of the other devices, each device including:
a panel having a body between a first end of the panel, a second end of the panel opposite the first end, a top of the panel, and a bottom of the panel opposite the top, wherein:
the first end includes a slot having a width,
the second end includes a tongue having a region and a lock, the region having a thickness that is less than the slot's width but greater than one half of the slot's width, and that extends into the slot of one of the other, corresponding devices and is allowed to move within the slot toward the top of the panel of the other, corresponding device when the tongue is urged in the direction of the top of the panel of the other, corresponding device, the lock holding the tongue's region in the slot of the other, corresponding device, and
the bottom includes an interface operable to contact a container to support the panel above a container when the pour-over is positioned on the container.

17. The pour-over frame of claim 16 wherein each of the three or more devices that are coupled together, are identical.

* * * * *